United States Patent
Chi et al.

(10) Patent No.: US 9,658,683 B2
(45) Date of Patent: *May 23, 2017

(54) SEPARATING POWER DOMAINS OF CENTRAL PROCESSING UNITS

(71) Applicant: Taiwan Semiconductor Manufacturing Company, Ltd., Hsin-Chu (TW)

(72) Inventors: Shyh-An Chi, Hsin-Chu (TW); Jyy Anne Lee, Taipei (TW)

(73) Assignee: Taiwan Semiconductor Manufacturing Company, Ltd., Hsin-Chu (TW)

(*) Notice: Subject to any disclaimer, the term of this patent is extended or adjusted under 35 U.S.C. 154(b) by 0 days.

This patent is subject to a terminal disclaimer.

(21) Appl. No.: 14/590,617

(22) Filed: Jan. 6, 2015

(65) Prior Publication Data

US 2015/0127968 A1 May 7, 2015

Related U.S. Application Data

(63) Continuation of application No. 12/751,670, filed on Mar. 31, 2010, now Pat. No. 8,930,733.

(60) Provisional application No. 61/186,728, filed on Jun. 12, 2009.

(51) Int. Cl.
| | |
|---|---|
| G06F 1/32 | (2006.01) |
| G06F 1/26 | (2006.01) |
| G05F 1/10 | (2006.01) |
| G06F 1/28 | (2006.01) |

(52) U.S. Cl.
CPC .............. *G06F 1/3296* (2013.01); *G05F 1/10* (2013.01); *G06F 1/26* (2013.01); *G06F 1/28* (2013.01); *G06F 1/3203* (2013.01); *G06F 1/3287* (2013.01); *Y02B 60/1278* (2013.01); *Y02B 60/1282* (2013.01); *Y02B 60/1285* (2013.01)

(58) Field of Classification Search
CPC ........ G06F 1/26; G06F 1/3203; G06F 1/3287; G06F 1/3296; Y02B 60/1278; Y02B 60/1282; Y02B 60/1285
See application file for complete search history.

(56) References Cited

U.S. PATENT DOCUMENTS

| | | | |
|---|---|---|---|
| 6,848,055 B1 * | 1/2005 | Yarch ................... | G06F 1/3203 713/300 |
| 7,812,408 B1 | 10/2010 | Ratnakumar et al. | |
| 8,930,733 B2 * | 1/2015 | Chi et al. ..................... | 713/320 |
| 2005/0189930 A1 | 9/2005 | Wu et al. | |
| 2007/0016810 A1 | 1/2007 | Ono | |
| 2007/0150763 A1 | 6/2007 | Yang et al. | |

(Continued)

OTHER PUBLICATIONS

Flautner, Krisztian et al., "A Combined Hardware-Software Approach for Low-Power SoCs: Applying Adaptive Voltage Scaling and Intelligent Energy Management Software," DesignCon 2003: System-on-Chip and ASIC Design Conference, 17 pages.

(Continued)

*Primary Examiner* — Dennis M Butler
(74) *Attorney, Agent, or Firm* — Slater Matsil, LLP

(57) ABSTRACT

A circuit includes a central processing unit (CPU), which includes a first memory block having a first power domain; and a core block signally connected to the first memory block and having a second power domain disconnected from the first power domain.

23 Claims, 7 Drawing Sheets

(56) References Cited

U.S. PATENT DOCUMENTS

| | | |
|---|---|---|
| 2007/0162776 A1 | 7/2007 | Carpenter et al. |
| 2008/0001795 A1 | 1/2008 | Arabi et al. |
| 2008/0074171 A1* | 3/2008 | Bhattacharya ...... H01L 27/0251 |
| | | 327/538 |
| 2008/0244278 A1 | 10/2008 | Monferrer et al. |
| 2009/0106576 A1 | 4/2009 | Jacobowitz et al. |
| 2009/0167270 A1 | 7/2009 | Lam et al. |
| 2009/0172283 A1 | 7/2009 | Khellah et al. |
| 2010/0148839 A1* | 6/2010 | Chai ........................ G11C 7/08 |
| | | 327/276 |

OTHER PUBLICATIONS

Lee, Jeabin et al., "Dynamic Voltage and Frequency Scaling (DVFS) Scheme for Multi-Domains Power Management," IEEE Asian Solid-State Circuits Conference, Nov. 12-14, 2007, Jeju, Korea, pp. 360-363.

Suleiman, Diary R. et al., "Dynamic Voltage Frequency Scaling (DVFS) for Microprocessors Power and Energy Reduction," 4th International Conference on Electrical and Electronics Engineering, Dec. 2005, 5 pages.

* cited by examiner

SEPARATING POWER DOMAINS OF CENTRAL PROCESSING UNITS

This application claims the benefit of and is a continuation application of U.S. application Ser. No. 12/751,670 filed on Mar. 31, 2010, entitled "Separating Power Domains of Central Processing Units," which application claims the benefit of U.S. Provisional Application No. 61/186,728 filed on Jun. 12, 2009, entitled "Separating Power Domains of Central Processing Units," both of which applications are hereby incorporated herein by reference.

TECHNICAL FIELD

This invention relates generally to power management schemes of central processing units (CPUs).

BACKGROUND

Central processing units (CPUs) are widely used in personal computers, and embedded applications, such as videos, graphics, wireless communications, and the like, are key components of many system-on-chip (SoC) applications. A common requirement to the design of CPUs is to increase their energy efficiency. The energy efficiency may be measured using a performance to power ratio, which may be, for example, million instructions per second (MIPS)/mW or million operations per second (MOPS)/mW. MIPS are units for expressing performance and indicate how many millions of instructions the CPU can process per second.

In general, power consumption is proportional to the square of an applied power supply voltage. A decrease in the power supply voltage is hence the most effective way to reduce power consumption. In a whole system, the clock frequency of a CPU is the highest among all the necessary building blocks in order to meet application requirements. As a result, power consumption and heat generation are also the highest among all building blocks. Accordingly, reducing a CPU's power consumption is the most effective way to reduce the system's overall power consumption. However, reducing the power supply voltage of a CPU may result in the speed of the CPU being reduced. Dynamic power supply control thus comes into play. Known dynamic power supply control techniques include dynamic voltage and frequency scaling (DVFS) techniques and adaptive voltage scaling (AVS) techniques, which have been used to improve energy efficiency. DVFS and AVS techniques have the ability to dynamically reduce power supply voltage to satisfy different operating conditions and different operation requirements. For example, if it is determined that a low performance is required or the external environment allows for a reduced power supply voltage, the power supply voltage provided to the CPU is reduced. Otherwise, the power supply voltage is maintained or even increased.

The DVFS and AVS techniques, however, suffer from limitations in both SoC and system-in-package (SiP) applications. For example, when integrated on SoC applications, a CPU may include embedded memories, such as level-1 cache memories. Referring to FIG. 1, CPU 100 includes memory block 102 and core block 104. Core block 104 is built in libraries and stored as "standard cells." These libraries contain large numbers of pre-designed circuits (also referred to as basic building blocks). Voltage regulator module 106 generates power supply voltage VDD and provides power supply voltage VDD to CPU 100. DVFS/AVS system 108 determines the magnitude of, and controls voltage regulator module 106 to generate, the desirable power supply voltage VDD.

The magnitude of power supply voltage VDD must be high enough to satisfy the Vcc_min requirement of memory block 102, wherein Vcc_min is the minimum power supply voltage needed to reliably perform read and write operations on memory block 102. Unfortunately, the Vcc_min is typically greater than the minimum operation voltage of core block 104. This means that a reduction in the power consumption of core block 104 is capped by the requirement of memory block 102.

SUMMARY OF THE INVENTION

In accordance with one aspect of the present invention, a circuit includes a central processing unit (CPU), which includes a first memory block having a first power domain; and a core block signally connected to the first memory block and having a second power domain disconnected from the first power domain.

In accordance with another aspect of the present invention, a circuit includes a CPU. The CPU includes a first memory block having a first power domain; and a second memory block having a second power domain separated from the first power domain. The circuit further includes a first voltage regulator module connected to the first memory block and configured to generate a first operation voltage for the first power domain; a first dynamic voltage controller connected to, and controlling, the first voltage regulator module to generate the first operation voltage; and a second voltage regulator module separated from the first voltage regulator module and connected to the core block. The second voltage regulator module is configured to generate a second operation voltage different from the first operation voltage for the second power domain.

The advantageous features of the present invention include maximized energy efficiency in the CPU and flexible power management schemes.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the embodiments of the present invention are discussed in detail below. It should be appreciated, however, that the embodiments provide many applicable inventive concepts that can be embodied in a wide variety of specific contexts. The specific embodiments discussed are merely illustrative of specific ways to make and use the invention, and do not limit the scope of the invention.

A novel power management scheme for central processing units (CPUs) is provided. The variations and the operation of the embodiment are then discussed. Throughout the various views and illustrative embodiments of the present invention, like reference numbers are used to designate like elements.

Figure 1:
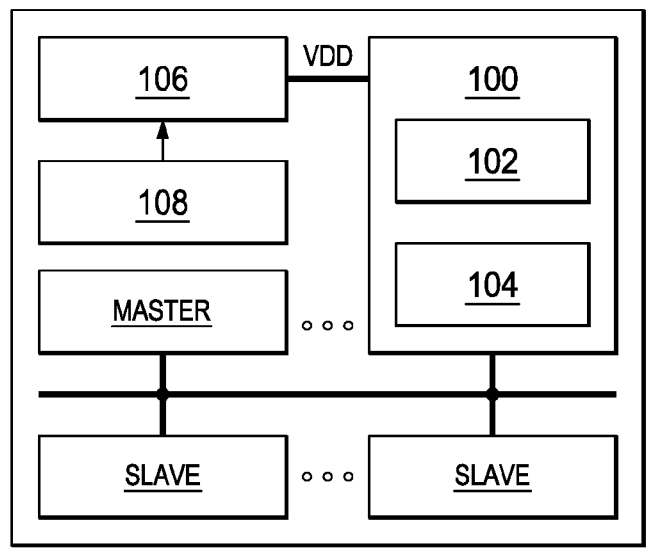
FIG. 1 illustrates a conventional power management scheme for a central processing unit (CPU)
Figure 2:
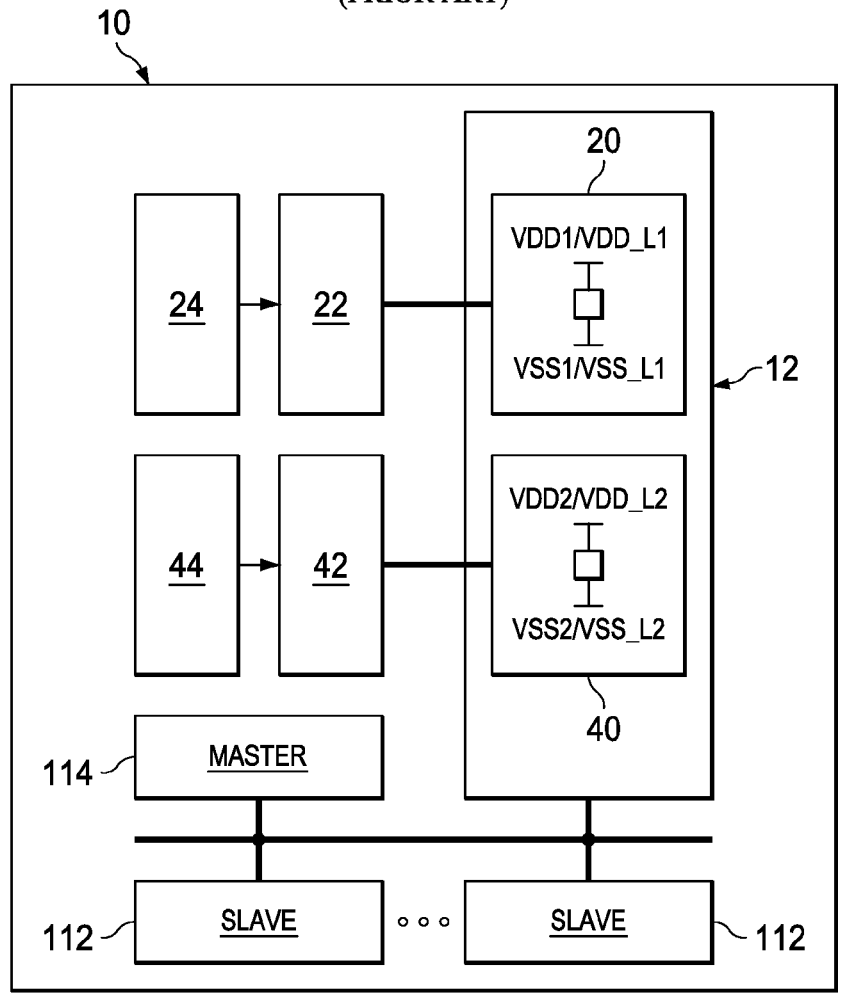
FIGS. 2 through 7 are embodiments of the present invention, wherein power domains of memory blocks in CPUs are separated from power domains of core blocks.

FIG. 2 illustrates an embodiment of the present invention, which includes CPU 12. Chip 10, in which CPU 12 is located, may include system-on-chip (SoC) applications. Besides CPU 12, chip 10 may also include additional components, including, but not limited to, additional master block 114 and slave blocks 112. Each of blocks 114 and 112 may adopt a same power management scheme as CPU 12, as will be discussed in detail in subsequent paragraphs. Other components, such as additional memories separated from CPU 12, slave blocks 112, and master block 114, may also be included. CPU 12 includes memory block 20, which may be embedded inside, although it can also be external to, CPU 12. CPU 12 also includes core block 40, which may be signally connected to memory block 20. That is, core block 40 may access memory block 20. In an exemplary embodiment, memory block 20 may include a level-1 (L1) cache. Core block 40, which may also be a logic circuit, may include an instruction fetch circuit, an instruction decode circuit, a register file circuit, a cache controller and the like.

Memory block 20 and core block 40 may have separated power domains. Throughout the description, the term "operation voltage" refers to the positive power supply voltage, which is also known as VDD. In memory block 20, the power domain includes power line VDD_L1, which carries positive operation voltage VDD1, and power line VSS_L1, which carries voltage VSS1 that is lower than voltage VDD1, wherein voltage VSS1 may be an electrical ground voltage. In core block 40, the power domain includes power line VDD_L2, which carries positive operation voltage VDD2, and power line VSS_L2, which carries voltage VSS2 lower than voltage VDD2. Again, voltage VSS2 may be an electrical ground voltage. The separate power domains of memory block 20 and core block 40 mean that power line VDD_L1 is separate from power line VDD_L2, and hence operation voltage VDD1 is not tied to operation voltage VDD2. In an embodiment, with the separate power domains, power line VDD_L1 is separated from power line VDD_L2, and power line VSS_L1 is separated from power line VSS_L2. In alternative embodiments, with the separate power domains, power line VDD_L1 is separated from power line VDD_L2, while power line VSS_L1 is interconnected to power line VSS_L2.

Memory block 20 is connected to voltage regulator module 22 and to dynamic voltage controller 24 that controls voltage regulator module 22 to generate desirable operation voltage VDD1 for operating memory block 20. Voltage regulator module 22 is capable of adjusting operation voltage VDD1 to different levels, which may include a list of voltages, and/or a continuously-adjustable voltage. The generated voltage VDD1 depends on the control signal provided by dynamic voltage controller 24. In an embodiment, dynamic voltage controller 24 adopts a dynamic voltage and frequency scaling (DVFS) technology, which is an energy-saving technology that may vary the frequency and voltage of a processor in real-time according to processing needs. For example, if CPU 12 needs to process a heavy-load work (such as a video application), dynamic voltage controller 24 that adopts the DVFS technology may control voltage regulator module 22 to generate a high operation voltage VDD1, so that the performance and the frequency of CPU 12 may be increased. Alternatively, if CPU 12 needs to process a light-load work (such as an audio application), dynamic voltage controller 24 that adopts the DVFS technology may control voltage regulator module 22 to generate a low operation voltage VDD1, so that the performance and the frequency of CPU 12 may be reduced. In alternative embodiments, dynamic voltage controller 24 adopts an adaptive voltage scaling (AVS) technology, which uses a closed-loop monitoring system to monitor system margin by comparing expected and actual operating conditions. By using the AVS technology, operation voltage VDD 1 can be reduced (optimized) without sacrificing operational stability. In alternative embodiments, dynamic voltage controller 24 adopts both DVFS and AVS technologies. By using dynamic voltage controller 24 and voltage regulator module 22, operation voltage VDD1 that is provided to memory block 20 may be adjusted to optimize the operation and the power consumption of memory block 20.

Core block 40 is connected to voltage regulator module 42 and dynamic voltage controller 44 that controls voltage regulator module 42 to generate desirable operation voltage VDD2 for operating core block 40. Similarly, voltage regulator module 42 is capable of adjusting operation voltage VDD2 to different levels, which may include a list of voltages and/or a continuously-adjustable voltage. The generated voltage VDD2 also depends on the control signal provided by dynamic voltage controller 44. The available voltages VDD1 and VDD2 may be different from, or identical to, each other. For example, the available voltages VDD1 that can be generated by voltage regulator module 22 may form a first voltage list, while the available voltages VDD2 that can be generated by voltage regulator module 42 may form a second voltage list. At least one voltage is in one of the first voltage list and the second voltage list, but not in the other. Dynamic voltage controller 44 may also adopt DVFS and/or AVS technologies to generate desirable operation voltage VDD2, so that operation voltage VDD2 provided to core block 40 may be adjusted to optimize the operation and the power consumption of core block 40. Voltage regulator modules 22 and 42 may be identical to each other, or may be different from each other, for example, having different designs.

Since the power domains of memory block 20 and core block 40 are separated, each of memory block 20 and core block 40 may be provided with an optimized operation voltage that is not restricted by the required operation voltage of the other. For example, at a low-power mode that does not require a high voltage, operation voltage VDD2 may be reduced to 0.7V so that the power consumption of core circuit 40 is low. Memory block 20 may be operated at 1.0V to maintain an adequate static noise margin to meet the Vcc min requirement.

Figure 3:
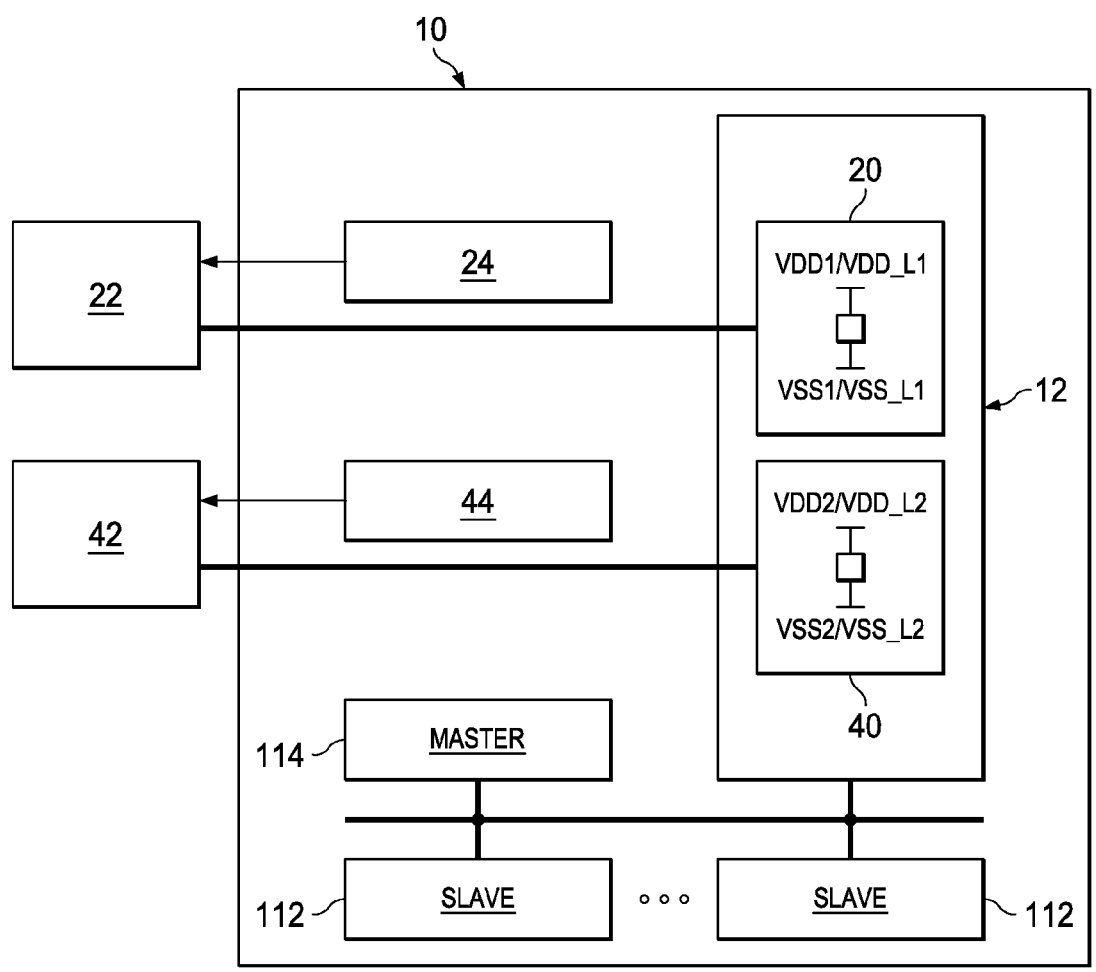

FIG. 3 illustrates an alternative embodiment of the present invention. This embodiment is essentially the same as the embodiment shown in FIG. 2, except that voltage regulator modules 22 and 42 are external to chip 10. Since voltage regulator modules 22 and 42 may include analog circuits, separating them from the digital circuits in chip 10 may increase the yield in the manufacturing of chip 10.

Figure 4:
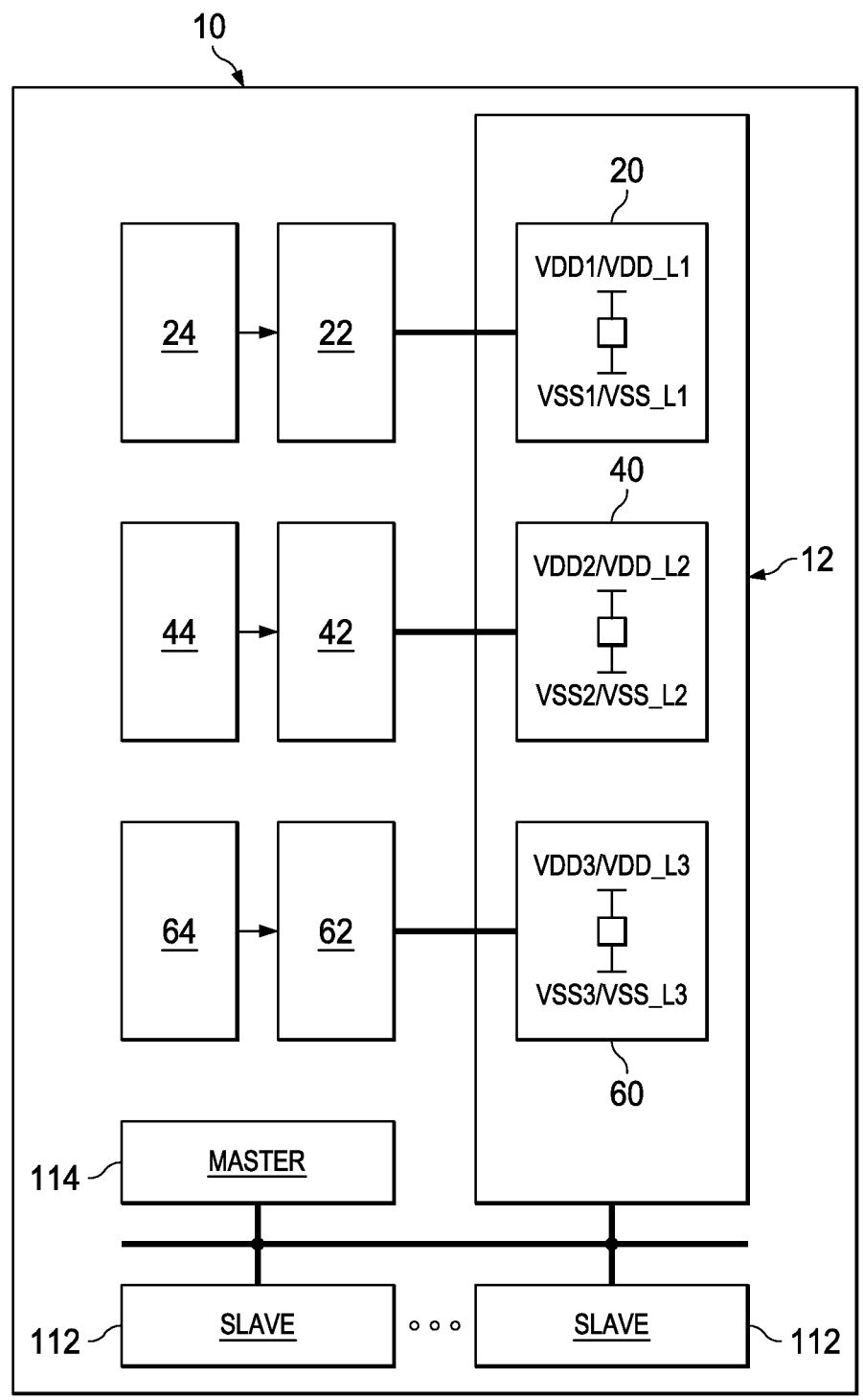

Referring to FIG. 4, CPU 12 includes additional memory block 60 connected to voltage regulator module 62, which may have essentially the same function as voltage regulator modules 22 and 42. Voltage regulator 62 is connected to, and controlled by, dynamic voltage controller 64, which may also have essentially the same function as dynamic voltage controllers 24 and 44. The power domain of memory block 60 may be separated from the power domains of memory block 20 and/or core block 40. Accordingly, power line VDD_L3 is disconnected from power lines VDD_L1 and/or VDD_L2. Further, power line VSS_L3 may also be disconnected from power lines VSS_L1 and/or VSS_L2, although two, or all of three, of them may be interconnected. In an embodiment, memory block 20 includes an L1 cache, while memory block 60 includes a level-2 (L2) cache. In alternative embodiments, memory blocks 20 and 60 comprise different types of memories selected from, but not limited to, non-volatile memories (flash memories), magneto-resistive random access memory (MRAM), static random access memory (SRAM), phase change random access memory (PCRAM), dynamic random access memory (DRAM), resistive random access memory (RRAM), and the like.

Figure 5:
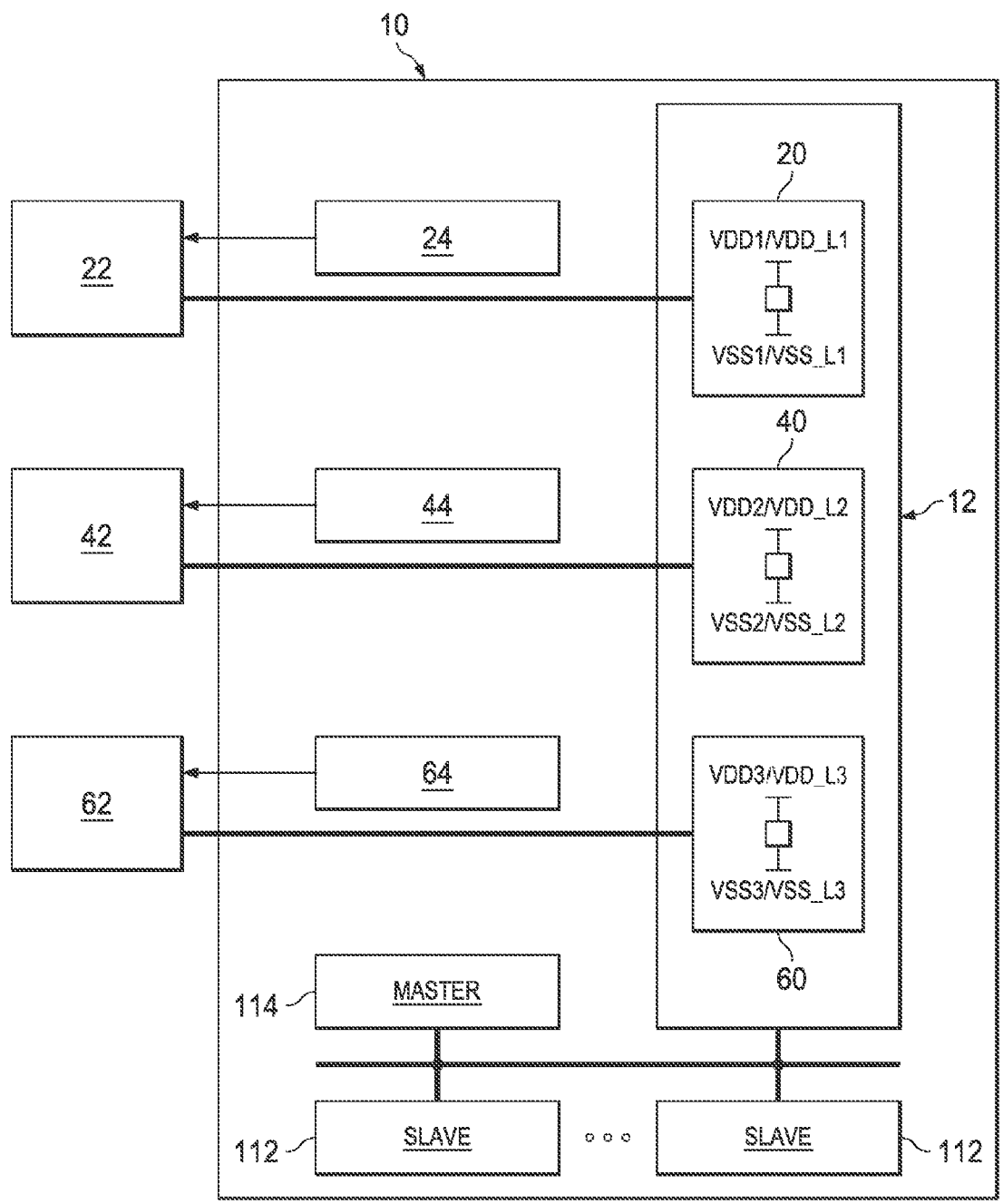

FIG. 5 illustrates an alternative embodiment of the present invention. This embodiment is essentially the same as the embodiment shown in FIG. 4, except that voltage regulator modules 22, 42, and 62 are external to chip 10.

Figure 6:
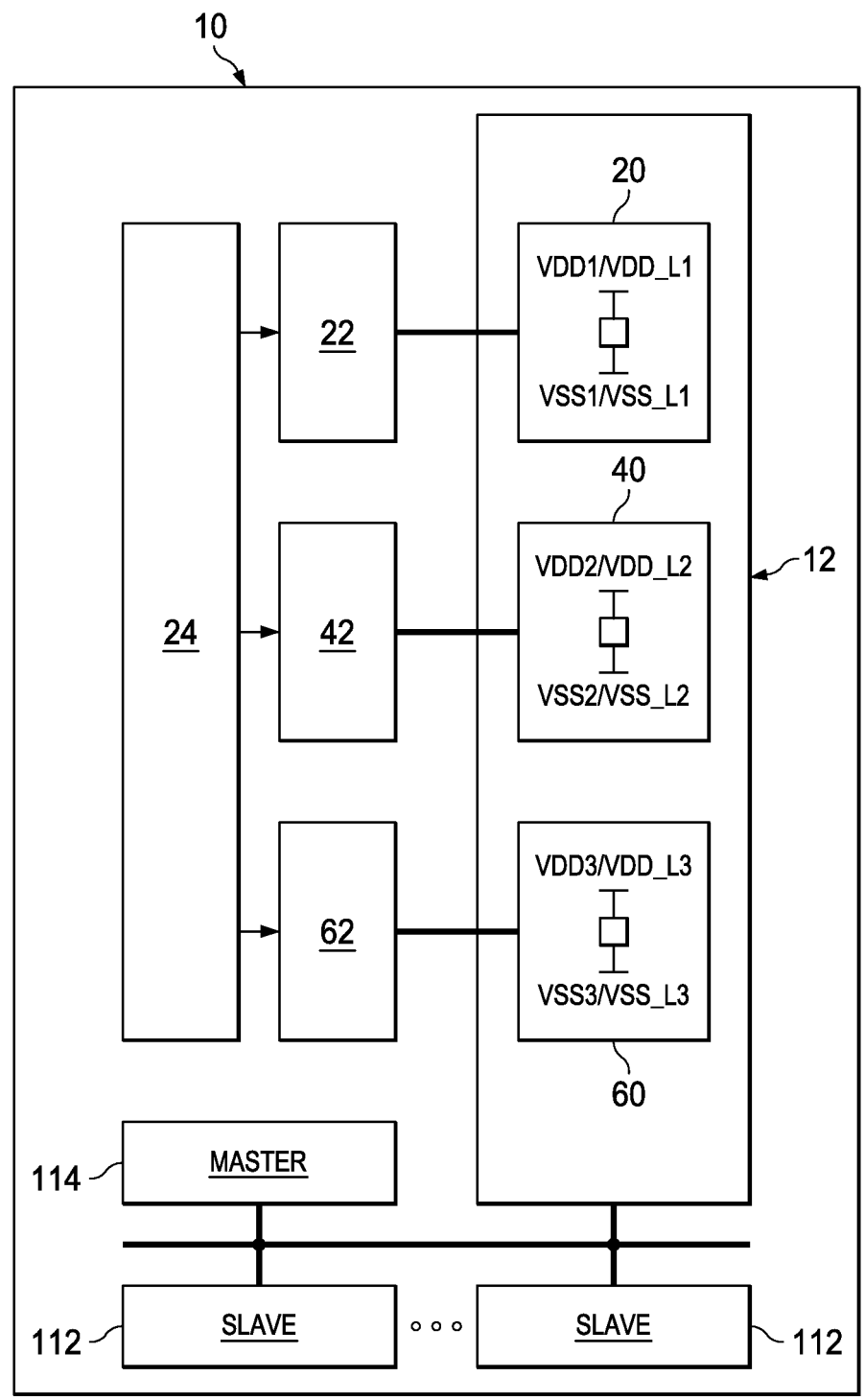

In FIG. 6, each of memory block 20, additional memory block 60, and core block 40 are connected to a separate voltage regulator module, namely voltage regulator modules 22, 42, and 62. A common dynamic voltage controller 24 controls voltage regulator modules 22, 42 and 62. Again, the power domains of memory block 20, additional memory block 60, and core block 40 are separated from each other, and hence the respective power supply voltages VDD1, VDD3, and VDD2 may be optimized and may be different from each other.

Figure 7:
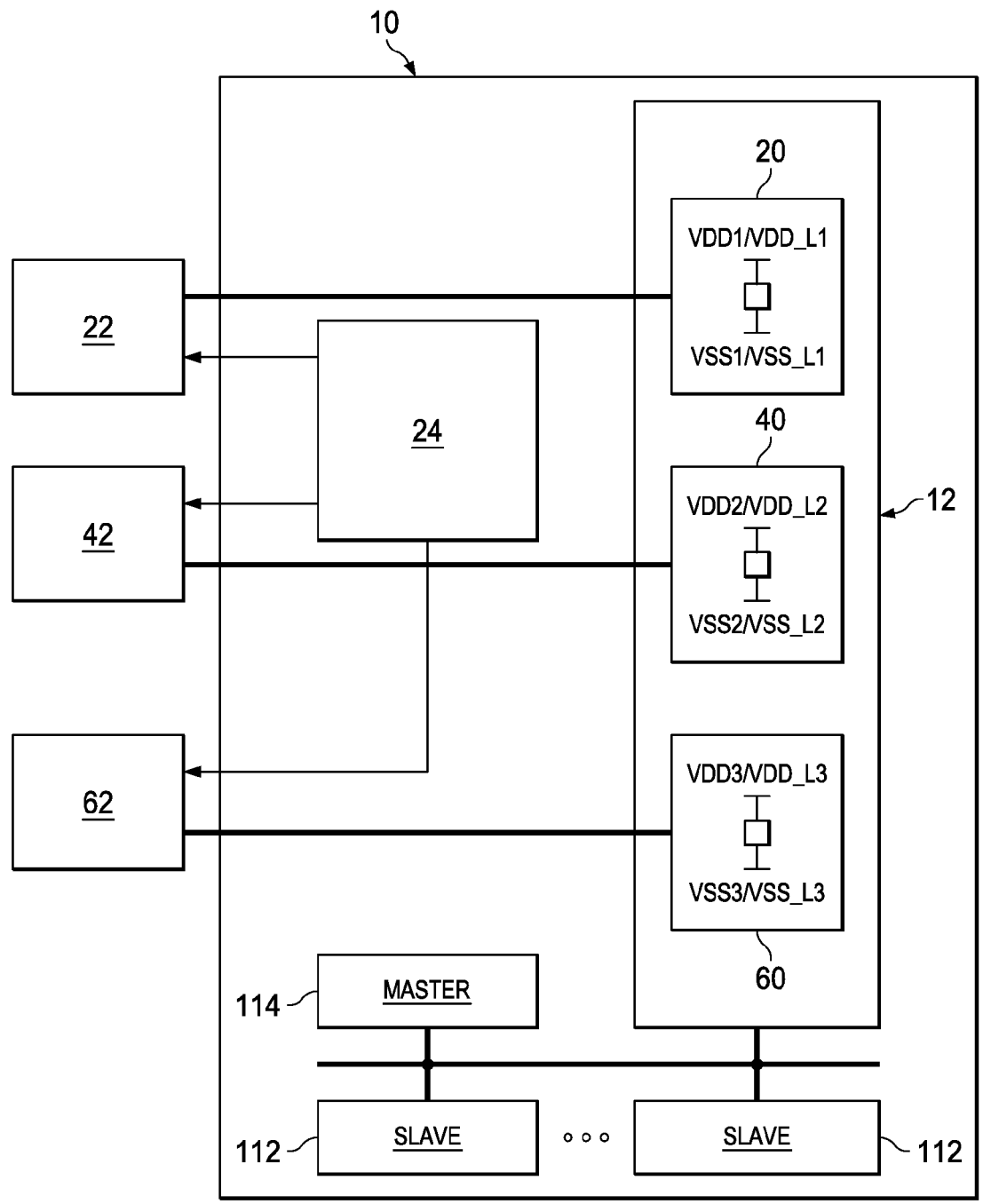

FIG. 7 illustrates an alternative embodiment of the present invention. This embodiment is essentially the same as the embodiment shown in FIG. 6, except that voltage regulator modules 22, 42, and 62 are external to chip 10. Again, in each of FIGS. 5 through 7, like elements are used to designate like components as shown in FIG. 4.

Figure 8:
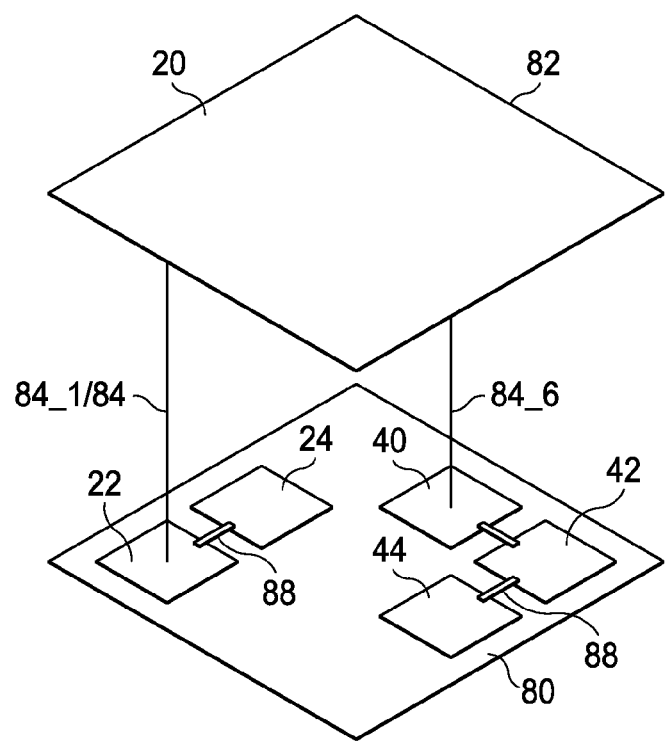
FIGS. 8 are 9 are system-in-package (SiP) applications in accordance with embodiments of the present invention.
Figure 9:
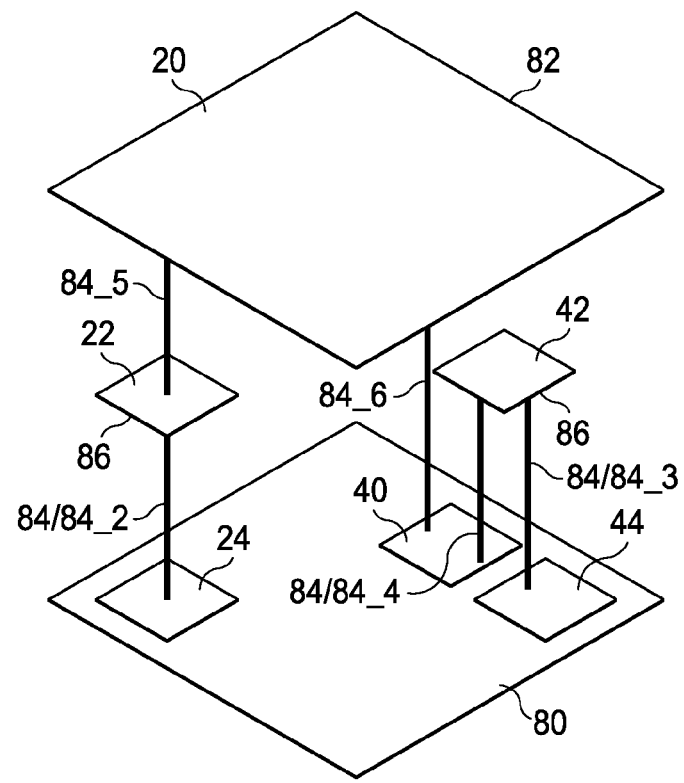

The embodiments shown in FIGS. 2 through 7 are SoC applications. FIGS. 8 and 9 illustrate system-in-package (SiP) applications. Referring to FIG. 8, core block 40, voltage regulator modules 22 and 42, and dynamic voltage controllers 24 and 44 are in die 80. Memory block 20 is in another die 82. The connections such as the connection between core block 40 and memory block 20 and the connection between voltage regulator module 22 and memory block 20 may be made through through-silicon vias (TSVs) 84. Dies 80 and 20 may be combined into a same package.

Core block 40 and dynamic voltage controllers 24 and 44 determine the optimum operation voltages for core block 40 and memory block 20, respectively, according to process/temperature conditions and/or software commands, and send control signals to voltage regulator modules 22 and 42 through signal lines 88. Voltage regulator module 22 generates a corresponding voltage for memory block 20, and provides the voltage to memory 20 through TSV 84_1. Voltage regulator module 42 generates a corresponding voltage for core block 40, and provides the voltage to core block 40. TSV 84_6 is for providing control signals for address/data read/write control.

FIG. 9 illustrates another embodiment, wherein core block 40 and dynamic voltage controllers 24 and 44 are in die 80, while memory block 20 is in die 82. Voltage regulator modules 22 and 42 are each in a separate die 86. Again, the connections between dies 80, 82, and 86 are made through through-silicon vias (TSVs) 84. Dies 80, 84, and 86 may be combined into a same package. Again, TSV 84_6 is for providing control signals for address/data read/write control.

Core block 40 and dynamic voltage controllers 24 and 44 determine the operating voltages for core block 40 and memory block 20 according to process/temperature conditions and/or software commands, and send control signals to voltage regulator modules 22 and 42 through TSV 84_2 and TSV 84_3, respectively. Voltage regulator modules 22 and 42 generate operation voltages for core block 40 and memory block 20 and provide the operation voltage to core block 40 and memory block 20 through TSVs 84_4 and 84_5, respectively.

By separating the power domains of memory blocks and core blocks in CPUs, the operation voltages of the memory blocks and the core blocks may be adjusted to optimum values, so that the power consumption of the CPUs can be minimized, while the performance of the CPUs can still meet requirements. Experiments have revealed that by separating the power domains of memory blocks and core blocks, the power consumption of CPUs can be reduced up to 20 percent as compared to similar CPUs having unseparated power domains.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. In addition, each claim constitutes a separate embodiment, and the combination of various claims and embodiments are within the scope of the invention.

What is claimed is:

1. A method comprising:
    providing a processor comprising:
        a first memory block in a first power domain; and
        a core block coupled to the first memory block, the core block in a second power domain;
    providing a first voltage regulator to generate a first operational voltage coupled to the first power domain;
    providing a second voltage regulator to generate a second operational voltage coupled to the second power domain;
    controlling the first voltage regulator with one or more voltage controllers; and
    controlling the second voltage regulator with the one or more voltage controllers, the controlling the first voltage regulator and the second voltage regulator comprising setting the second operational voltage to a second voltage level lower than the first operational voltage from a first voltage level equal to the first operational voltage, wherein the one or more voltage controllers and the core block are configured to determine the first operational voltage and the second operational voltage, and the first voltage regulator and the second voltage regulator are in a same die as the core block.

2. The method of claim 1, wherein the step of controlling the first voltage regulator includes adjusting the first operational voltage using dynamic voltage and frequency scaling (DVFS).

3. The method of claim 1, wherein the step of controlling the first voltage regulator includes adjusting the first operational voltage using adaptive voltage scaling (AVS).

4. The method of claim 1, further comprising:
providing a third memory block in a third power domain, with the core block coupled to the third memory block; and
controlling a third operational voltage of the third power domain with the one or more voltage controllers.

5. The method of claim 1, wherein the first memory block is physically located on a first die and the core block is physically located on a second die.

6. The method of claim 1, wherein a single voltage controller controls the first operational voltage and the second operational voltage.

7. The method of claim 1, wherein a first voltage controller controls the first operational voltage and a second voltage controller controls the second operational voltage.

8. The method of claim 1 wherein the step of controlling the first voltage regulator includes optimizing the first operational voltage.

9. The method of claim 8, further comprising optimizing the second operational voltage independently of the first operational voltage.

10. A method comprising:
generating a first operation voltage for a first power domain of a first memory block disposed in a processor and comprising a first type of memory, wherein the first operation voltage is generated by a first voltage regulator module coupled to the first memory block; and
generating a second operation voltage for a second power domain of a second memory block coupled with the processor and separate from the first memory block, the second memory block comprising a second type of memory, wherein the second operation voltage is generated by a second voltage regulator module coupled to the second memory block;
wherein:
the processor, the first voltage regulator module, and the second voltage regulator module are in a first die;
the processor and one of the first voltage regulator module or the second voltage regulator module are configured to determine the first operation voltage or the second operation voltage;
the second type of memory is in a second die different from the first die;
the first type of memory is a SRAM type of memory; and
the second type of memory is a non-SRAM type of memory.

11. The method of claim 10, further comprising:
generating a third operation voltage for a third power domain of a core block, the core block comprising a processing unit, wherein the third operation voltage is different from at least one of the first operation voltage and the second operation voltage and is generated by a third voltage regulator module coupled to the core block.

12. The method of claim 11, wherein the core block is located on a first die and at least one of the first memory block or the second memory block is located on a second die, and further comprising transferring at least one of the first operation voltage and the second operation voltage generated on the first die to the second die.

13. The method of claim 10, further comprising optimizing the first operation voltage and the second operation voltage independently.

14. The method of claim 10, wherein at least one of the first operation voltage and the second operation voltage are generated using dynamic voltage and frequency scaling (DVFS).

15. The method of claim 10, further including selecting a first operation voltage from amongst a list of available voltages.

16. The method of claim 10, wherein the first type of memory and the second type of memory comprise a plurality of caches of the processor.

17. The method of claim 10, wherein the second type of memory is a DRAM.

18. The method of claim 17, wherein the DRAM is an embedded DRAM (eDRAM).

19. A method comprising:
providing a processor comprising a core block disposed in a first die and having a first power domain, and a memory block disposed in a second die and having a second power domain, wherein the first die is vertically stacked with the second die;
at least one of a first voltage controller or a second voltage controller determining a first operational voltage of the first power domain or a second operational voltage of the second power domain;
supplying the first operational voltage to the first power domain, wherein the first operational voltage is generated by a first voltage regulator in the first die; and
supplying the second operational voltage to the second power domain separately from the supplying the first operational voltage, wherein the second operational voltage is generated by a second voltage regulator in the first die.

20. The method of claim 19, further comprising receiving a software command to configure at least one of the first operational voltage and the second operational voltage.

21. The method of claim 19, wherein determining the first operational voltage of the first power domain comprises generating the first operational voltage during operation of the processor.

22. The method of claim 21, wherein determining the second operational voltage of the second power domain comprises generating the second operational voltage during operation of the processor.

23. The method of claim 19, wherein the first operational voltage is optimized for core block performance and the second operational voltage is optimized for memory block performance.

* * * * *